US011250271B1

(12) United States Patent
Shayne et al.

(10) Patent No.: US 11,250,271 B1
(45) Date of Patent: Feb. 15, 2022

(54) CROSS-VIDEO OBJECT TRACKING

(71) Applicant: Objectvideo Labs, LLC, Tysons, VA (US)

(72) Inventors: Ethan Shayne, Clifton Park, NY (US); Donald Gerard Madden, Columbia, MD (US); Gang Qian, McLean, VA (US); Weihong Yin, Great Falls, VA (US)

(73) Assignee: ObjectVideo Labs, LLC, Tysons, VA (US)

(*) Notice: Subject to any disclaimer, the term of this patent is extended or adjusted under 35 U.S.C. 154(b) by 0 days.

(21) Appl. No.: 16/995,379

(22) Filed: Aug. 17, 2020

Related U.S. Application Data (60) Provisional application No. 62/888,026, filed on Aug. 16, 2019.

(51) Int. Cl.
*G06K 9/00* (2006.01)
*G06K 9/62* (2006.01)

(52) U.S. Cl.
CPC ..... *G06K 9/00771* (2013.01); *G06K 9/00718* (2013.01); *G06K 9/6267* (2013.01)

(58) Field of Classification Search
CPC ........... G06K 9/00771; G06K 9/00718; G06K 9/6267
See application file for complete search history.

(56) References Cited

U.S. PATENT DOCUMENTS

| | | | |
|---|---|---|---|
| 9,111,444 B2 | 8/2015 | Kaganovich | |
| 9,549,162 B2 * | 1/2017 | Yoshida | H04N 9/79 |
| 10,645,344 B2 | 5/2020 | Marman et al. | |
| 2010/0104144 A1 * | 4/2010 | Momosaki | G06F 16/70 382/118 |
| 2013/0002863 A1 * | 1/2013 | Jia | G06K 9/6264 348/143 |
| 2014/0089145 A1 * | 3/2014 | Sunkada | G06Q 30/02 705/26.63 |
| 2015/0131872 A1 * | 5/2015 | Ganong | G06K 9/00677 382/118 |
| 2015/0208042 A1 * | 7/2015 | Jia | G06K 9/6264 348/143 |
| 2015/0248587 A1 * | 9/2015 | Oami | H04N 7/181 382/103 |
| 2017/0124385 A1 * | 5/2017 | Ganong | G06F 16/50 |
| 2020/0202208 A1 * | 6/2020 | Li | G06N 20/00 |
| 2020/0394395 A1 * | 12/2020 | Ong | G06K 9/00765 |

* cited by examiner

*Primary Examiner* — John B Strege
(74) *Attorney, Agent, or Firm* — Fish & Richardson P.C.

(57) ABSTRACT

Methods, systems, and apparatus, including computer programs encoded on a computer storage medium, for finding lost objects. In some implementations, an unassociated object that appeared in a video from a property is identified. Known entities for the property are identified. A number of times that the known entities appeared in videos from the property is obtained. An order to display the known entities for the property based on a number of times that the known entities appeared in videos from the property are determined. An indication that the unassociated object is associated with a particular entity of the known entities is received. An image of the unassociated object from the video in association with the particular entity of the known entities is stored.

20 Claims, 5 Drawing Sheets

//CROSS-VIDEO OBJECT TRACKING

CROSS-REFERENCE TO RELATED APPLICATION

This application claims the benefit of U.S. Provisional Application No. 62/888,026, filed Aug. 16, 2019, and titled "CROSS-VIDEO OBJECT TRACKING," which is incorporated by reference.

TECHNICAL FIELD

This description generally relates to video analytics.

BACKGROUND

Developing and testing video analytics depends heavily on sample video with accurate ground-truth data. Typically, ground-truth data is gathered by having a person watch each sample video and annotate their observations.

SUMMARY

Obtaining accurate ground-truth data may be important for developing and testing video analytics. Ground-truth data may be an assumed correct interpretation of objects within a video sample. Input from a human regarding interpretation of objects may be considered ground-truth. For example, if a user draws an outline around an area of a frame and specifies that area shows a human, it may be considered ground-truth that the area of the frame shows a human. In another example, if a user does not draw an outline around any area of a frame and was supposed to draw an outline around any humans, then it may be considered ground-truth that the frame does not show any humans even though the frame does show humans. Because ground-truth data may be assumed as correct, it is important for a system to help users input accurate information used as ground-truth.

The ground-truth data may include location or coordinate information for each object in each frame of the video sample, the type of object (e.g., a person, an animal, a vehicle, a building, a plant or other stationary object, other non-stationary objects, etc.), and one or more direction of movements of each object throughout the timespan of the video sample. Accordingly, obtaining ground-truth data may involve tracking targets through the frames of a video sample.

Generating ground-truth data may be done on the video clip or video sample level such that generated ground-truth data for a particular clip, at least initially, does not consider data or ground-truth data generated for other clips. For example, a tracked object or target from a clip may be labeled with the number "1". In this example, the number 1 is unique in that no other objects from the clip are labelled number 1 or can be labelled number 1 after it has been associated with the tracked object or target. However, this label is only valid for that particular clip and does not identify the object across all clips. Ground-truth data may be improved such that tracked objects are provided an identifier valid across all clips or across all clips associated with a particular monitored property. Allowing for cross-clip associations may be helpful to track objects as they move between fields of view of different cameras.

In one general aspect, a method includes: identifying an unassociated object that appeared in a video from a property; identifying known entities for the property; obtaining a number of times that the known entities appeared in videos from the property; determining an order to display the known entities for the property based on a number of times that the known entities appeared in videos from the property; and receiving an indication that the unassociated object is associated with a particular entity of the known entities.

Implementations may include one or more of the following features. For example, in some implementations, the method includes storing an image of the unassociated object from the video in association with the particular entity of the known entities.

In some implementations, identifying the unassociated object that appeared in the video includes: obtaining one or more thumbnails from the video that each include a representation of an object that appeared in the video; analyzing the one or more thumbnails to obtain information that corresponds to the object; and determining, using the information, that the object is eligible for association with a known entity of the property.

In some implementations, analyzing the one or more thumbnails includes analyzing the one or more thumbnails to determine at least one of: a size of at least one representation of the object in the video, an average size of multiple representations of the object in the video, that the one or more thumbnails have been marked as usable or unusable, an object classification associated with the one or more thumbnails, or a number of the one or more thumbnails; and determining that the object is eligible for association with a known entity of the property includes determining at least one of: that a size of at least one representation of the object meets a threshold size, that an average size of multiple representations of the object meets a threshold size, that at least one representation of the object has been marked as usable, that an object classification associated with the one or more thumbnails is a permitted classification, or that a number of the one or more thumbnails meets a threshold number.

In some implementations, identifying the known entities for the property includes accessing a list of entities that have previously been identified from one or more previously analyzed videos.

In some implementations, the method includes selecting from the list of entities a subset of entities using eligibility criteria, where the known entities are those entities in the subset of entities.

In some implementations, selecting from the list of entities the subset of entities using eligibility criteria includes selecting from the list of entities only those entities that meet at least one of the following eligibility criteria: have previously been identified from one or more previously analyzed videos from the property; have appeared in a threshold number of videos; have appeared in a threshold number of videos from the property; have appeared in a threshold number of frames of videos; have appeared in a threshold number of frames of videos from the property; have appeared in a video that corresponds to a time that is less than a threshold amount of time from a current time; correspond to an object classification that is the same as an object classification corresponding to the unassociated object; have each been assigned a respective identification that is unique to a corresponding entity across multiple videos; or have not been associated with any previously unassociated objects that appeared in the video.

In some implementations, determining the order to display the known entities for the property based on the number of times that the known entities appeared in videos from the property includes determining the order to display the known entities for the property based on (i) a first factor that represents the number of times that the known entities appeared in videos from the property and (ii) a second factor that represents last association times that indicate when the known entities were most recently associated with a previously unassociated object.

In some implementations, the method includes applying a first weight to the first factor to generate a weighted first factor; and applying a second weight to the second factor to generate a weighted second factor, where the second weight is less than the first weight, where determining the order to display the known entities for the property based on the first factor and the second factor includes determining the order to display the known entities for the property based on (i) the weighted first factor and (ii) the weighted second factor.

In some implementations, the method includes, in response to receiving the indication that the unassociated object is associated with the particular entity: accessing an identification corresponding to the particular entity, where the identification is unique to the particular entity across multiple videos; and assigning the identification corresponding to the particular entity to the unassociated object.

Other embodiments of these aspects include corresponding systems, apparatus, and computer programs encoded on computer storage devices, configured to perform the actions of the methods. A system of one or more computers can be so configured by virtue of software, firmware, hardware, or a combination of them installed on the system that, in operation, cause the system to perform the actions. One or more computer programs can be so configured by virtue having instructions that, when executed by data processing apparatus, cause the apparatus to perform the actions.

Implementations of the techniques in the application can provide various advantages and improvements over previous systems. For example, the system allows for tracked objects found in ground-truth data to be identified across multiple clips. Identifying tracked objects across multiple clips is advantageous to the development of accurate video analytic algorithms for recognizing particular objects. However, there are often too many tracked objects, on a scale of hundreds of thousands, and too many images of tracked objects, on a scale of millions, to efficiently display to a user and to have the user compare with a particular unassociated tracked object. Accordingly, having a process that significantly reduces the number of tracked objects displayed and the number of images of those objects displayed without sacrificing accuracy is advantageous.

An additional advantages of the techniques in the application include improved generation of ground-truth information, accuracy of object identification across video clips, and face-recognition and/or object recognition techniques. For example, the system can gather multiple images of what has been identified as the same person across multiple video clips. This provides multiples views of each person, e.g., depicting them wearing different clothing, under different lighting conditions, in different weather, and/or from different camera perspectives. These multiple views may be made available to users who rely on the views to generate ground-truth information from video clips. This can result in improved generation of ground-truth information as the users will have access to additional views of previously identified objects which will allow for better identification of objects in video clips currently being analyzed. As a result, accuracy of object identification is improved as objects in the video clips being analyzed are more likely to be identified correctly. Finally, the improved ground-truth information can be used in the training and testing of face-recognition and/or object-recognition algorithms to generate improved algorithms that can more accurately and/or consistently identify object(s) or persons.

Moreover, the system provides a fast process by, for example, removing any known entities for association that are from a different monitored property than the unassociated object, that have been categorized differently than the unassociated object, and that have already been identified with a previously unassociated object from the same clip as the unassociated object. Accordingly, the number of known entities that are displayed to the user for association with an unassociated object are greatly reduced.

The system also improves speed by, for example, sorting known entities by those most commonly associated and those most recently associated. Accordingly, the system provides the known entities that a user is most likely to select higher in a list of known entities, thereby reducing the time that the user spends searching through and selecting a known entity.

The system also improves speed by, for example, displaying a limited number of thumbnails for each known entity shown. The system selects thumbnails for display that are of sufficient quality by ensuring that they meet particular criteria.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
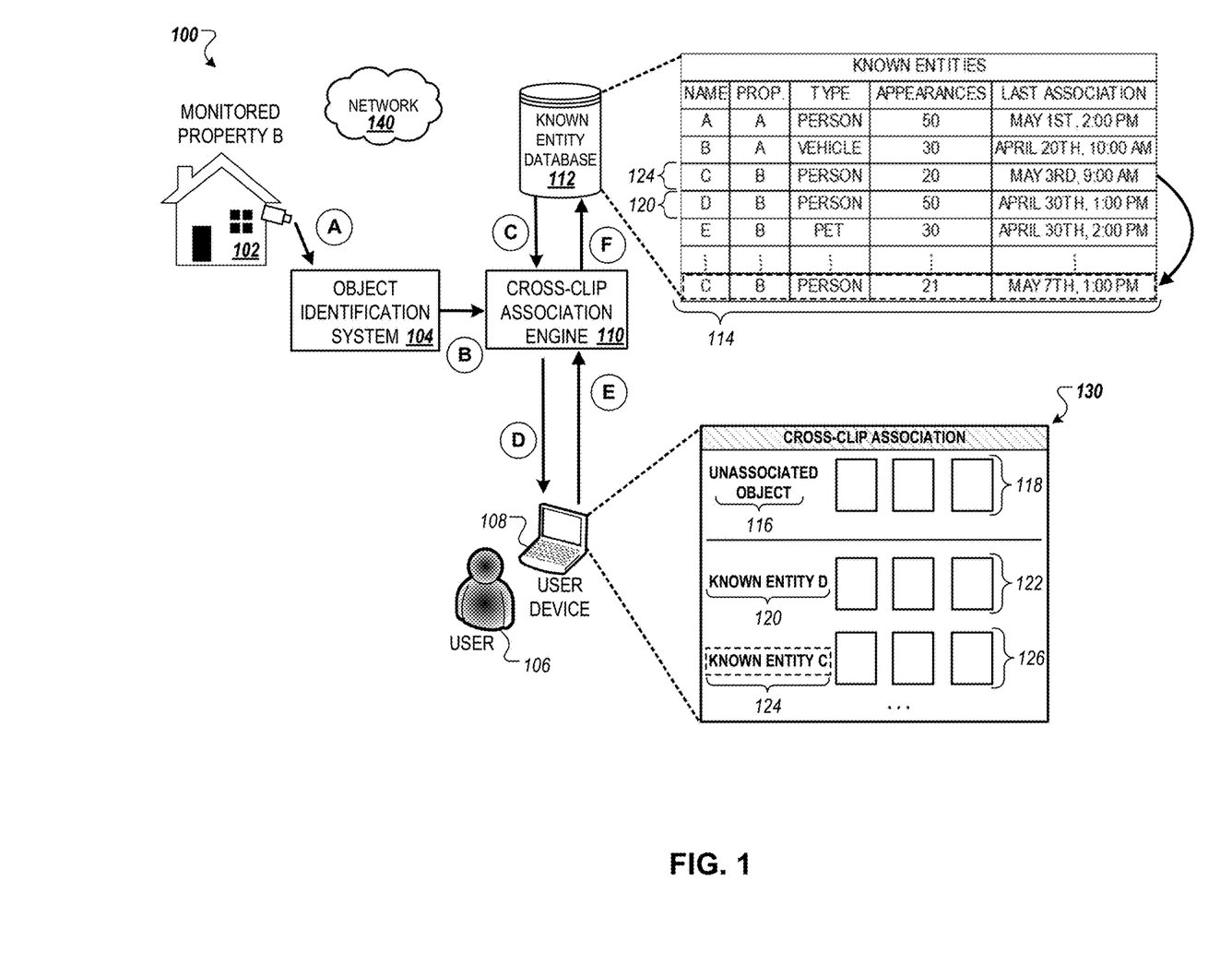
FIG. 1 is a diagram that illustrates an example system for cross-video object tracking.

FIG. 1 illustrates an example system 100 for cross-video object tracking. The system 100 includes an object identification system 104 that receives video data from the monitored property 102, a cross-clip association engine 110, a known entity database 112, and a user device 108.

The object identification system 104 may include one or more computers. The object identification system 104 may include a server or a collection of servers. The object identification system 104 may be on-site or may be remote, e.g., it may be provided by a third-party. The object identification system 104 can communicate with the cross-clip association engine 110 over a network 140.

The cross-clip association engine 110 may include one or more computers. The cross-clip association engine 110 may include a server or a collection of servers. The cross-clip association engine 110 may be on-site or may be remote, e.g., it may be provided by a third-party. The cross-clip association engine 110 can communicate with the user device 108 over the network 140

The user device 108 may be a computing device, such as a laptop computer, a desktop computer, a tablet computer, a mobile telephone, a smart phone, or a personal digital assistant (PDA).

The network 140 can include public and/or private networks and can include the Internet. The network 140 can be a cellular network.

In general, a thumbnail is an image from a video frame that is smaller in storage size than the video frame. That is, a thumbnail may be a coherent portion of a video frame. As an example, a thumbnail may be defined by a bounding box (or other shape) drawn on a video frame.

FIG. 1 also illustrates a flow of events, shown as stages (A) to (F), with each representing a step in an example process. Stages (A) to (F) may occur in the illustrated sequence, or in a sequence that is different from the illustrated sequence. For example, some of the stages may occur concurrently.

As shown in FIG. 1, in stage (A) the system 100 sends video data from a monitored property 102 ("Monitored Property B") to the object identification system 104. This video data may include a clip having one or more frames. The monitored property 102 may have one or more video cameras (e.g., visible-light cameras and/or infrared light cameras) installed at the monitored property 102. The monitored property 102 may obtain the video data from the one or more video cameras installed at the monitored property 102. The monitored property 102 may be associated with one or more tracked objects, e.g., persons, animals such as a pet or specific type of animal, vehicles, etc.

In some implementations, the system 100 sends video data from one or more other monitored properties to the object identification system 104. In these implementations, the one or more other monitored properties may have the same owner as the monitored property 102. In these implementations, the one or more other monitored properties may be associated with the same or a similar set of tracked objects, e.g. occupants, as the tracked objects of the monitored property 102. For example, the one or more other properties may be determined to be frequently visited by one or more of the occupants of the monitored property 102. Accordingly, the system 100 may be able to obtain images from these one or more other monitored properties in order to obtain additional images of tracked objects associated with the monitored property 102.

At stage (A), the object identification system 104 generates ground-truth data for the video data it received. The object identification system 104 may receive drawn bounding boxes around tracked objects in each frame of the clip, may receive one or more classifications for the tracked objects (e.g., as a person, an animal, a type of animal, a pet, a vehicle, etc.), may receive face markup for one or more of the bounding boxes, may receive an indication that one or more of the bounding boxes are occluded, may receive an indication that one or more of the bounding boxes are unusable, may receive an indication that a tracked object, e.g. associated with one or more of the bounding boxes, is unusable, receive an indication that that two or more bounding boxes are associated with the same tracked object across the frames of the clip, etc. This information may be provided to the object identification system 104 by one or more system users. The object identification system 104 may use this information in generating ground-truth data for the received video data. In generating the ground-truth data for the received video data, the object identification system 104 may determine one or more classifications for the tracked objects, may associate tracked objects between frames of the clip, may change the size and shape of bounding boxes, etc. The object identification system 104 outputs the one or more tracked objects from the clip.

These one or more tracked objects may be considered unassociated objects as they have not yet been associated with a known entity. A known entity correlates with a specific object that has been previously identified. A known entity is unique across all clips or all clips originating from a particular monitored property, e.g. the monitored property 102. A known entity is unique in that it correlates with a single, specific object (e.g., a specific person, a specific pet, a specific vehicle, etc.) that no other known entity correlates with. A known entity may be provided an identification (cross-clip identification) that is unique across all clips or all clips originating from a particular monitored property, e.g. the monitored property 102.

In stage (B), the object identification system 104 outputs the one or more unassociated objects or an indication of the one or more unassociated objects from the clip to the cross-clip association engine 110. Sending the one or more unassociated objects or an indication of the one or more unassociated objects from the clip to the cross-clip association engine 110 may be facilitated by the system 100. The one or more unassociated objects or an indication of the one or more unassociated objects may be sent to the cross-clip association engine 110 over the network 140. The object identification system 104 may also send accompanying information with the one or more unassociated objects or an indication of the one or more unassociated objects.

This accompanying information may include, for example, a classification or type for each of the one or more unassociated objects, face markup information, a size or an average size for each of the one or more unassociated objects, a number for each of the unassociated objects indicating a number of frames that the respective unassociated object has appeared in, an indication of whether or not each of the unassociated objects has been marked as unusable, a time and date when the clip was taken from the monitored property 102, and/or a time associated with each of the frames in which the unassociated objects appear.

In some implementations, the object identification system 104 only outputs one unassociated object of the one or more unassociated objects at a time to the cross-clip association engine 110. In these implementations, the object identification system 104 may wait to send the next unassociated object after the first unassociated object has been associated with a known entity. In these implementations, the object identification system 104 may receive a notification from the cross-clip association engine 110, the user device 108, or more generally the system 100 when an unassociated object is associated with a known entity.

In some implementations, the object identification system 104 filters out unassociated objects that are not eligible for cross-clip association. In these implementations, the object identification system 104 may not send any unassociated objects that have been marked as unusable, that are too small (e.g., smaller than a threshold pixel size as indicated by their respective bounding box(es) or the average size of their respective bounding boxes), that are classified as a type of object that is not eligible for association (e.g., an animal that is not a pet, a bicycle, a squirrel, etc.), and/or that have not appeared in a sufficient number of frames of the clip (e.g., an unassociated object only appeared in 10% of the frames and the threshold level is 20%). Alternatively, all unassociated objects may be provided to the cross-clip association engine 110 and this filtering may be performed by the cross-clip association engine 110.

In stage (C), in response to receiving the one or more unassociated objects or an indication of the one or more unassociated objects from the clip, the cross-clip association engine 110 selects a first unassociated object 116 to associate with a known entity. The first unassociated object 116 may have a classification. For example, as shown, the first unassociated object 116 is classified as a person. The cross-clip association engine 110 proceeds to access the known entity database 112 and retrieve the stored known entities or a subset of known entities.

The known entity database 112 may contain information associated with all known entities across all monitored properties and/or all clips, all known entities associated with a particular property, e.g. the monitored property 102, or all known entities associated with a particular set of properties, e.g. a set of properties that includes the monitored property 102. The information associated with the known entities in the known entity database 112 may be stored as a table 114.

The table 114 may contain a name for each of the known entities, a monitored property associated with each of the known entities, a classification or type for each of the known entities, a number for each of the known entities indicating a number of clips that the respective known entity has appeared in, and a date and time for each of the known entities indicating a date and time when the respective known entity last appeared in a clip.

The subset of known entities retrieved may be known entities that are associated with the same monitored property as where the clip originated from (here, monitored property 102), are the same classification or type as the first unassociated object, have already been assigned a cross-clip identification, and/or have not yet been associated with a previously unassociated object from the clip. As shown in table 114, there are two known entities associated with the monitored property 102 ("Monitored Property B") that are also classified as a person. These two known entities include a known entity 120 ("Known Entity D") and a known entity 124 ("Known Entity C"). The cross-clip association engine 110 proceeds to retrieve the known entities 120 and 124 and/or information associated with the known entities 120 and 124 from the known entity database 112 due to them being associated with the monitored property 102 and being categorized as persons. There may be additional known entities that meet the requirements and are made part of the subset of known entities by the cross-clip association engine 110. These additional known entities may also be retrieved by the cross-clip association engine 110.

In stage (C), the cross-clip association engine 110 may sort the known entities that it retrieves as will be discussed in more detail with respect to FIGS. 2-3. The cross-clip association engine 110 may sort known entities based on which known entities are most commonly associated and/or which known entities were most recently associated. For example, the cross-clip association engine 110 may sort the known entities such that those which are more commonly associated are provided a higher in the order than those known entities that are rarely associated lower. The cross-clip association engine 110 may send this determined order to the user device 108, e.g. for display thereon.

The cross-clip association engine 110 may weigh one of the two factors, e.g. the commonly associated factor (e.g. as indicated by the number of appearances in table 114) and the recently associated factor (e.g., as indicated by the last association time and date in table 114), heavier than the other. For example, the cross-clip association engine 110, in determining an order of the known entities, may provide more weight to the commonly associated factor than to the recently associated factor. As another example, the cross-clip association engine 110 may use one factor for determining the order to display the known entities and use the second factor as a threshold to remove known entities from the list of known entities to send to the user device 108. For example, the cross-clip association engine 110 may create a subset of known entities based on those that have been associated with a previously unassociated object within the last six months and then sort the subset by those entities that are most commonly associated.

In some cases, the cross-clip association engine 110 also considers positional memory in determining a presentation order of the known entities. For example, when a user is iterating over unassociated objects from property B, the cross-clip association engine 110 may present the same or a similar list of known entities in the same or similar order as options for each unassociated object that the user analyzes. The order in which the known entities are presented may change as some known entities gain more weight based on the factors described above. However, it may be beneficial to not have the list of known entities change significantly or at all. Accordingly, the cross-clip association engine 110 may consider positional memory as its own factor, e.g. an "inertia" factor, separate from the commonly associated factor and the recently associated factor. The cross-clip association engine 110 may use all three factors in determining an order of the known entities. In determining an order of the known entities, the cross-clip association engine 110 may weigh the three factors differently. For example, the cross-clip association engine 110 may weigh the inertia factor higher than the commonly associated factor, and may weigh the inertia factor and the commonly associated factor both higher than the recently associated factor.

Here, the cross-clip association engine 110 has sorted the known entities 120 and 124 such that the known entity 120 appears higher. The cross-clip association engine 110 has placed the known entity 120 higher because the known entity 120 has made more appearances (fifty appearances per the table 114) than the known entity 124 (twenty appearances per the table 114) and because the last association time and date of the known entity 124 does not outweigh the appearance count despite being more recent than last association time and date of the known entity 120. As an example, the last association time and date of the known entity 124 may not outweigh the appearance count of the known entity 120 due to the last association time and date of the known entities 120 and 124 being relatively close together, e.g. within a week of each other, within two weeks of each other, within a month of each other, etc., and the appearance counts of the known entity 120 being significantly larger, e.g., at least 1.5 times larger, at least 2 times larger, at least 2.5 larger, etc., than the appearance counts of the known entity 124. As another example, the cross-clip association engine 110 may weigh the appearance counts more heavily than the last association time and date.

In stage (C), the cross-clip association engine 110 may select one or more indications of the unassociated object 116 and for each of the known entities 120 and 124. An indication may be a thumbnail image. For example, in stage (C), the cross-clip association engine 110 select thumbnails for the unassociated object 116 and for each of the known entities 120 and 124. In this example, the cross-clip association engine 110 may choose two to four thumbnails for the unassociated object 116 and for each of the known entities 120 and 124. This size and contents of each of the thumbnails may correspond with a bounding box drawn on a frame of video and the area of the frame surrounded by the bounding box.

The thumbnails chosen by the cross-clip association engine 110 may need to meet certain criteria. This criteria may include a particular size of the thumbnail or a particular size of a bounding box which was used to generate the thumbnail, if the bounding box associated with the thumbnail includes face markup, the clip that the thumbnail is taken from, the camera that was used to take the clip that the thumbnail was taken from, if the thumbnail was taken from the first frame in a clip, if the thumbnail was taken from the last frame in a clip, if an object within the thumbnail touches an edge of the thumbnail, if the thumbnail touches an edge of the frame from which it was taken, a time and date of the frame from which the thumbnail was taken, or if the bounding box associated with the thumbnail has been marked occluded. The process of selecting the thumbnails for the unassociated object 116 and the known entities 120 and 124 is discussed in more detail below with respect to FIG. 4.

In stage (D), the cross-clip association engine 110 outputs the known entities 120 and 124 and/or information associated with the known entities 120 and 124 to the user device 108. The cross-clip association engine 110 may output the known entities 120 and 124 and/or information associated with the known entities 120 and 124 to the user device 108 in response to a request sent by the user device 108. The request may be sent by the user device 108 in response to the system 100 receiving input indicating that the user 106 has logged in to the user device 108 and/or wishes to review unassociated objects. The known entities 120 and 124 and/or information associated with the known entities 120 and 124 may be sent to the user device 108 over the network 140.

In stage (D), the user device 108 displays an interface 130 containing the unassociated object 116, the known entity 120, and the known entity 124 and/or one or more indications for the unassociated object 116, the known entity 120, and the known entity 124. For example, as shown, the user device 108 displays the interface 130 containing the unassociated object 116, a series of thumbnails 118 representing the unassociated object 116, the known entity 120, a series of thumbnails 122 representing the known entity 120, the known entity 124, and a series of thumbnails representing the known entity 124. The process of selecting the thumbnails for the unassociated object 116 and the known entities 120 and 124 is discussed in more detail below with respect to FIG. 4.

In some implementations, an unassociated object is a new entity. In these implementation the user 106 may be able to mark that the unassociated object 116 is not associated with any known entities. As a result of marking the unassociated object 116 as a new entity, the system 100 may generate a cross-clip identification for the unassociated object 116.

In stage (D), the system 100 may receive input that the user 106 has selected one of the thumbnails of the unassociated object 116 in the series of thumbnails 118, one of the thumbnails of the known entity 120 in the series of thumbnails 122, or one of the thumbnails of the known entity 124 in the series of thumbnails 126. In response to this input, the system 100 may display the original frame of the clip from which the thumbnail was taken. In response to this input, the system 100 may play the clip or display each frame of the clip. In response to this input, the system 100 may show the position of the unassociated object 116 across the clip from which thumbnail originated. In response to this input, the system 100 may display to the user 106 through the user device 108 an option to see the original frame, to see the entire clip from which the thumbnail originated or each frame from the clip, or to see the position of the unassociated object across the clip from which the thumbnail originated.

In some implementations, in stage (D), the user 106 can request to see more thumbnails of the unassociated object 116, of the known entity 120, of the known entity 124, and/or of other known entities that may be displayed. For example, the user 106 may select one of the thumbnails from the series of thumbnails 118. In this example, the user 106 may be presented all of the thumbnails of the unassociated object 116 taken from each frame of the corresponding clip in which the unassociated object 116 appeared.

In some implementations, in stage (D), the user 106 can scroll through the interface 130 to reveal other known entities that were retrieved by the cross-clip association engine 110. For example, a known entity F (e.g., known entity 204 as shown in FIGS. 2-3) may have been included in the table 114 and retrieved by the cross-clip association engine 110 due to the known entity F being associated with the monitored property 102 and/or being categorized as a person. The known entity F may have been presented below the known entity 120 and the known entity 124 due to it having less recorded appearances than the known entities 120 and 124 and/or it having an older last association date and time than the known entities 120 and 124. By scrolling further down the interface 130 of the user device 108, the user 106 may be presented an indication of the known entity F and a series of corresponding thumbnails.

In stage (D), the user 106 selects to associate the unassociated object 116 with the known entity 124 as indicated by the dashed outline.

In some implementations, while the user 106 is reviewing the unassociated object 116, the system 100 prevents other users from reviewing other unassociated objects from the monitored property 102 including unassociated objects from clips other than the clip. For example, the system 100 prevents a user other than the user 106 from attempting to associate the unassociated object 116 with known entities. In this example, the system 100 may not present a user other than the user 106 unassociated objects including the unassociated object 116 from the monitored property 102. However, the system 100 may allow another user to review unassociated objects from a property other than the monitored property 102 while the user 106 is reviewing the unassociated object 116.

In stage (E), a notification is sent from the user device 108 to the cross-clip association engine 110 indicating that the unassociated object 116 should be associated with the known entity 124.

In some implementations, in stage (E), the cross-clip association engine 110 may request additional information related to the unassociated object 116. This request may be provided to the object identification system 104. This information may include a time and date when the clip was taken at the monitored property 102.

In some implementations, in stage (E), all or part of the accompanying information is provided to and/or requested by the cross-clip association engine 110. Alternatively, the accompanying information may be provided to and/or requested by the cross-clip association engine 110 in stage (C).

In stage (F), the cross-clip association engine 110 accesses the known entity database 112 and updates the stored information to reflect that the unassociated object 116 has been associated with the known entity 124. In updating the stored information, the cross-clip association engine 110 updates the information of the known entity 124 so that it now reflects that the known entity has now made 21 appearances instead of 20 appearances and that the last association was on May 7$^{th}$ at 1:00 pm, instead of May 3$^{rd}$ at 9:00 am, to reflect the date and time at which the clip, in which the unassociated object 116 had appeared, was taken.

In stage (F), the cross-clip association engine 110 may also store one or more of the thumbnails of the previously unassociated object 116 (e.g., from the series of thumbnails 118) in the known entity database 112 and associate those one or more thumbnails with the known entity 124.

Once the known entity database 112 has been updated, the cross-clip association engine 110 may move on to the next unassociated object from the clip. Accordingly, stage (D) through (F) may be repeated for the clip until all unassociated object that have not been filtered out have been associated with a known entity.

In some implementations, the user 106 or a different user may review previous associations made. For example, after the user 106 has associated the previously unassociated object 116 with the known entity 124, this association may be sent to a different user to verify that the association was correct. This different user may have the option to verify the association if they believe it to be correct. This different user may have the option to reject the association resulting in the object 116 being disassociated with the known entity 124. In this example, the user 106 may receive a notification from the system 100, e.g. through the user device 108, that their association has been verified or that their association has been rejected. A user may be limited to reviewing associations of one property at a time. For example, a user, when reviewing associations made with respect to the monitored property 102, may be limited to viewing only those associations that correspond with the monitored property 102 until all associations that correspond with the monitored property 102 have been verified or rejected. When a user is reviewing the associations that correspond with the monitored property 102, other users may be prevented from also reviewing associations that correspond with the monitored property 102 though they may review associations that correspond with other monitored properties.

In some implementations, the user 106 or a different user may be able to merge two or more known entities into a single known entity. This merge operation may be performed during a review process where a user can verify or reject one or more associations. As an example, a user may determine that a known entity "X" and a known entity "Y" appear to be the same person. The user may perform a merge operation such that the two entities become a single merged entity. The data associated with the known entity Y may be obtained and combined with the data associated with the known entity X, e.g. if the known entity Y has 25 appearances and the known entity X has 15 appearances, the merged entity will have 40 appearances. The merged entity may assume the name and/or ID of either known entity X or known entity Y, or the system 100 or the user may provide the merged entity a new name and/or ID.

Figure 2:
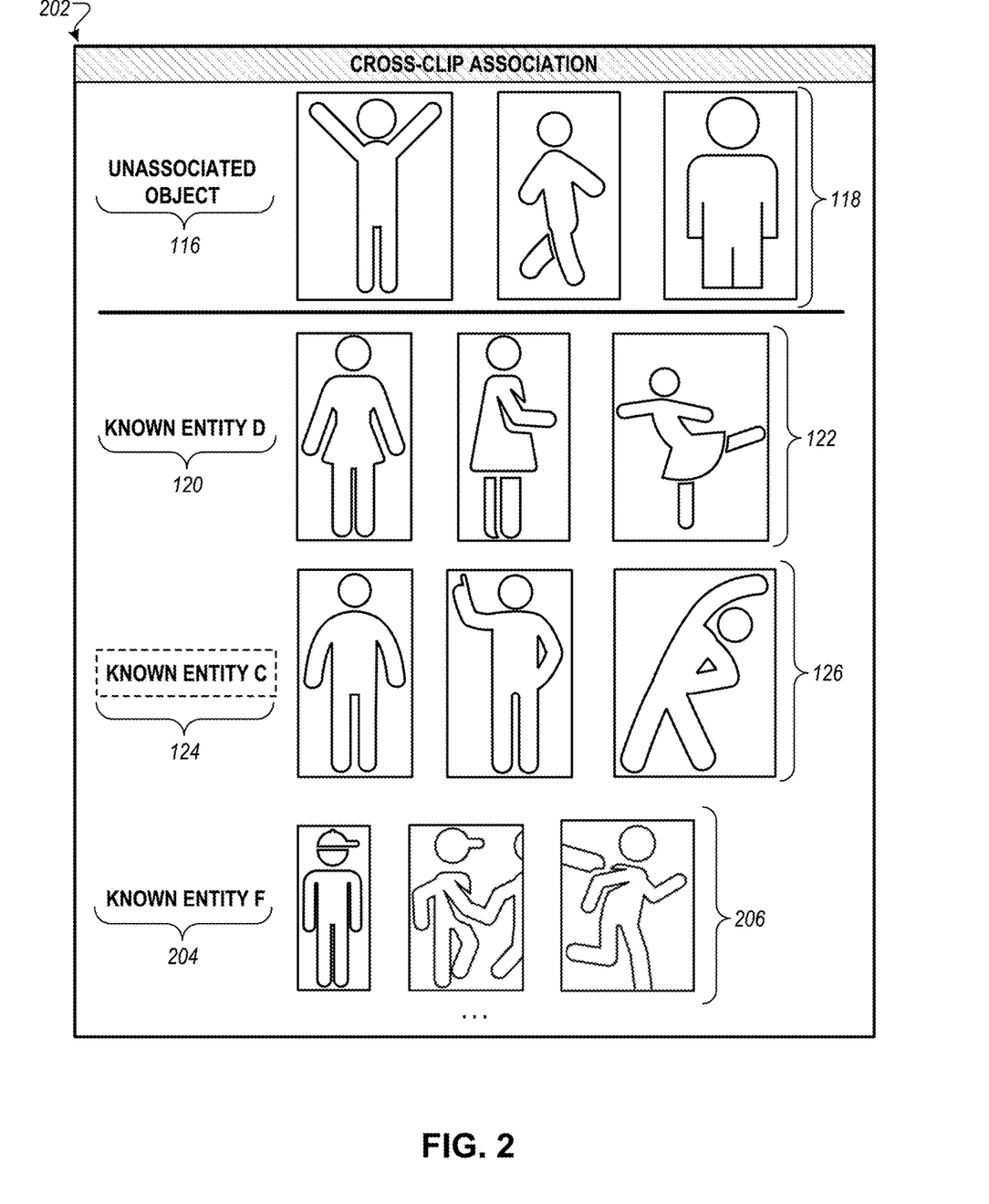
FIG. 2 is a diagram that illustrates associating an unassociated object with a known entity from a list of known entities.

FIG. 2 is a diagram that illustrates associating an unassociated object 116 with a known entity 124. The system 100 presents an interface 202 for display on a device (e.g., the user device 108 as shown in FIG. 1). The interface 202 may be the same interface as the interface 130 as shown in FIG. 1. The interface 202 includes the unassociated object 116, the series of thumbnails 118 representing the unassociated object 116, the known entity 120, the series of thumbnails 122 representing the known entity 120, the known entity 124, the series of thumbnails representing the known entity 124, a known entity 204 ("Known Entity F"), and a series of thumbnails 206 representing the known entity 204.

As shown, the thumbnails displayed in the interface 202 may be of different shapes and sizes. The shapes and size of any particular thumbnail may correspond with the shape and size of the bounding box associated with the particular thumbnail, e.g. the thumbnail may have the same dimensions as its corresponding bounding box, the thumbnail may have dimensions that are proportional to its corresponding bounding box but are scaled down, the thumbnail may have dimensions that are proportional to its corresponding bounding box but are scaled up, etc. For example, the thumbnails in the series of thumbnails 206 for the known entity 204 may be, on average, smaller than the thumbnails for the other known entities 120 and 124 and smaller than the thumbnails for the unassociated object 116 because the bounding boxes drawn around the known entity 204 (e.g., during the process of obtaining ground truth data by the object identification system 104 shown in FIG. 1) were smaller. The thumbnails in the series of thumbnails 206 for the known entity 204 being smaller than the thumbnails for the other known entities 120 and 124 and smaller than the thumbnails for the unassociated object 116 may indicate that the known entity 204 is smaller than the known entities 120 and 124 and smaller than the unassociated object 116. When one or more of the thumbnails are scaled down, e.g. in order to fit within the interface 202, a user may be able to select one of the thumbnails to view a full-size image. The full-size image may have the same dimensions as the bounding-box that corresponds with the selected thumbnail.

As shown, the system 100 has selected three thumbnails for each of the objects. In some implementations, less thumbnails are selected (e.g., two thumbnails). In some implementations, more thumbnails are selected (e.g., four thumbnails).

In some implementations, the number of thumbnails that the system 100 selects for each of the objects is dependent on the number of thumbnails available. For example, if a known entity has only appeared in two frames of one clip, only two thumbnails could be generated for the known entity, one for each of the frames. In these implementations, different objects may have a different number of thumbnails associated with them.

The system 100 sorts the known entities 120, 124, and 204 based off of two factors. The first factor represents how commonly the known entities are associated. The second factor represents how recently the known entities were last associated. The system 100 may implement the cross-clip association engine 110 shown in FIG. 1 to perform the sorting. The system 100 may weigh one of the two factors heavier than the other. For example, the system 100 in determining an order to display the known entities may give the first factor a higher weight than the second factor. The system 100 may use the first factor for determining the order to display the entities and use the second factor as a threshold to remove entities from the displayed list of known entities. This threshold may be, for example, the last week, the last month, the last two months, the last six months, the last year, the last two years, etc. For example, the system 100 may create a subset of known entities based on those that have been associated with a previously unassociated object within the last six months and then sort the subset by those entities that are most commonly associated.

As shown, the unassociated object 116 appears to be a male adult, the known entity 120 appears to be a female adult, the known entity 124 appears to be a male adult, and the known entity 204 appears to be a male child—based off of a combination of the object's appearance in the thumbnails and the size of the thumbnails in the series of thumbnails 206). Accordingly, the unassociated object 116 appears to be most similar to the known entity 124. The system 100 shown in FIG. 1 may have selected the known entities 120, 124, and 204 based on all of them being categorized as persons and the unassociated object 116 having been categorized as a person. The system 100 may have selected an order of the known entities 120, 124, and 204. For example, the system 100 may have select to present the known entities 120 and 124 higher than the known entity 204 due to the known entities 120 and 124 having been classified as adults, the known entity 204 not having been classified as an adult (e.g. the known entity 204 may have been classified as a child), and the unassociated object 116 having been classified as an adult. In some implementations, where an object is classified as a person, the system 100 may automatically further classify the object as an adult or a child based on the size of the object.

As another example, the system 100 may have selected to present the known entities 124 and 204 higher than the known entity 204 due to the known entities 124 and 204 having been classified as male, the known entity 120 have not been classified as male (e.g. the known entity may have been classified as a female), and the unassociated object 116 having been classified as a male. As another example, the system 100 may have selected a descending order of known entity 124 followed by known entity 120, followed by known entity 204. The system 100 may select this order based on a combination of the classifications of the known entities 120, 124, and 204 and with the unassociated object 116, e.g. an adult classification and a sex classification, and/or based on a weight applied to those classifications, e.g. an adult classification may be provided a higher weight than a sex classification due to, for example, users providing ground-truth data being more likely to make a mistake in classifying a sex of a person than in determining whether the person is an adult.

Here the system 100 receives an input from a system user (e.g. the user 106 shown in FIG. 1) indicating a selection of the known entity 124. Based off of the received input, the system 100 associates the unassociated object 116 with the known entity 124.

In some implementations, the system 100 may choose to present all the thumbnails of a particular known entity on an interface for associating an unassociated object of a device such as the interface 202. In these implementations, the system 100 may display a grid or list containing all of the thumbnails for the particular entity in the interface 202 shown in FIG. 2. The grid or list of thumbnails may be scrollable in a horizontal and/or vertical direction. The grid or list of thumbnails may be arranged in the order of the video from which the thumbnails were taken, e.g. by the age of the video from which the thumbnails were taken. For example, the system 100 may present a thumbnail of a known entity taken from the most recent video available containing that known entity before other thumbnails of the known entity taken from older videos.

In some implementations, the system 100 may choose not to present one or more known entities for associating with the unassociated object 116 based on the classifications assigned to those one or more known entities and/or the classification assigned to the unassociated object 116. For example, the system 100 may recognize that unassociated object 116 has been classified as a person. Accordingly, the system 100 may choose to only present known entities that have been classified as a person.

In some implementations, the system 100 has not received a classification for the unassociated object 116. In these implementations, the system 100 may choose to present some or all of the available known entities, e.g. all of the known entities from that corresponding monitored property, regardless of their classification. In these implementations, once a user has associated the unassociated object 116 with one of the known entities, the unassociated object 116 may obtain the classification of the known entity that it has been associated with. For example, here, if the unassociated object 116 was not classified at the time of association, the system 100 would classify the unassociated object 116 as a person once it receives an indication to associate the unassociated object 116 with the known entity 124 due to the known entity 124 having a person classification.

Figure 3:
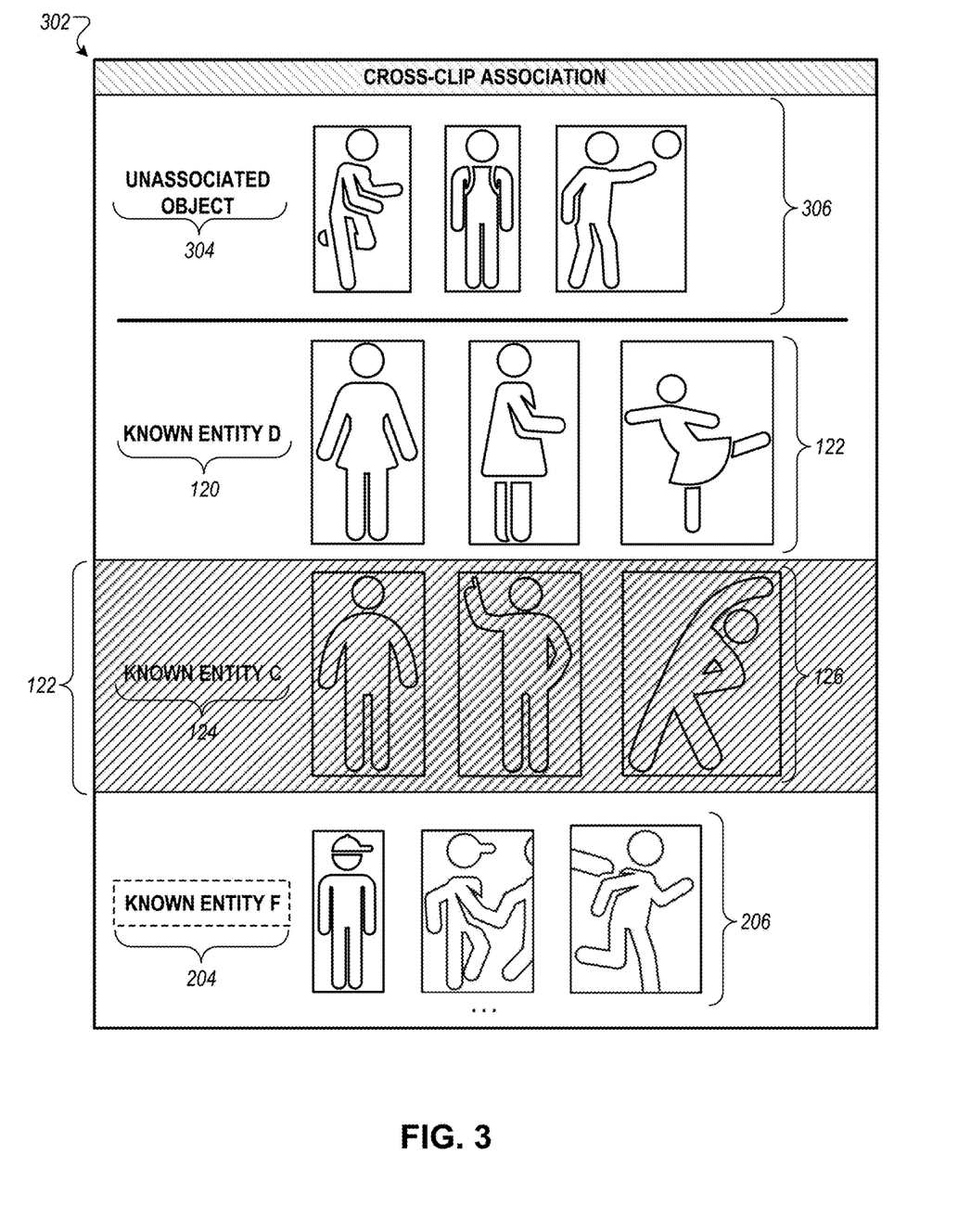
FIG. 3 is a diagram that illustrates excluding a known entity from a list of known entities while associating an unassociated object with a known entity.

FIG. 3 is a diagram that illustrates associating an unassociated object 304 with a known entity 204. The system 100 presents an interface 302 for display on a device (e.g., the user device 108 as shown in FIG. 1). The system 100 may display the interface 302 after the unassociated object 116 is associated with the known entity 124 shown in FIG. 2. The interface 302 includes the unassociated object 304, the series of thumbnails 306 representing the unassociated object 304, the known entity 120, the series of thumbnails 122 representing the known entity 120, the known entity 124, the series of thumbnails representing the known entity 124, the known entity 204, and the series of thumbnails 206 representing the known entity 204. The unassociated object 304 is from the same clip as the unassociated object 116 shown in FIGS. 1-2. For example, the unassociated object 304 may be the next unassociated object in the clip being analyzed, where the unassociated object 116 shown in FIGS. 1-2 was the unassociated object immediately preceding the unassociated object 304 in the same clip.

As shown, the system 100 may gray out the known entity 124 and the series of thumbnails 126 as a result of the known entity 124 having been associated with the previously unassociated object 116 shown in FIGS. 1-2. Because the known entity 124 has already been associated with a tracked object from the clip and because the tracked objects within any clip are distinct from one another, the known entity 124 should not be an option for association with the unassociated object 304. By graying out the known entity 124, the system 100 prevents a user (e.g., the user 106) from selecting the known entity 124 and, accordingly, prevents the unassociated object 304 from being associated with the known entity 124. The system 100 may choose to still display an indication of the known entity 124 instead of removing it all together while unassociated objects for the same clip are being associated. The system 100 may choose to display this indication for the benefit of a system user.

In some implementations, where the known entity 124 has already been associated with a tracked object from the clip, the system 100 removes all indication of the known entity 124. For example, the system 100 removes the name of the known entity 124 and the series of thumbnails 126 from the list of known entities displayed in the interface 302.

As shown, the unassociated object 304 appears to be a male child (e.g., based off of a combination of the object's appearance in the thumbnails and the size of the thumbnails in the series of thumbnails 206), the known entity 120 appears to be a female adult, the known entity 124 appears to be a male adult, and the known entity 204 appears to be a male child (e.g., based off of a combination of the object's appearance in the thumbnails and the size of the thumbnails in the series of thumbnails 206). Accordingly, the unassociated object 304 appears to be most similar to the known entity 204.

Here the system 100 receives an input from a system user (e.g. the user 106 shown in FIG. 1) indicating a selection of the known entity 204. Based off of the received input, the system 100 associates the unassociated object 116 with the known entity 124.

Figure 4:
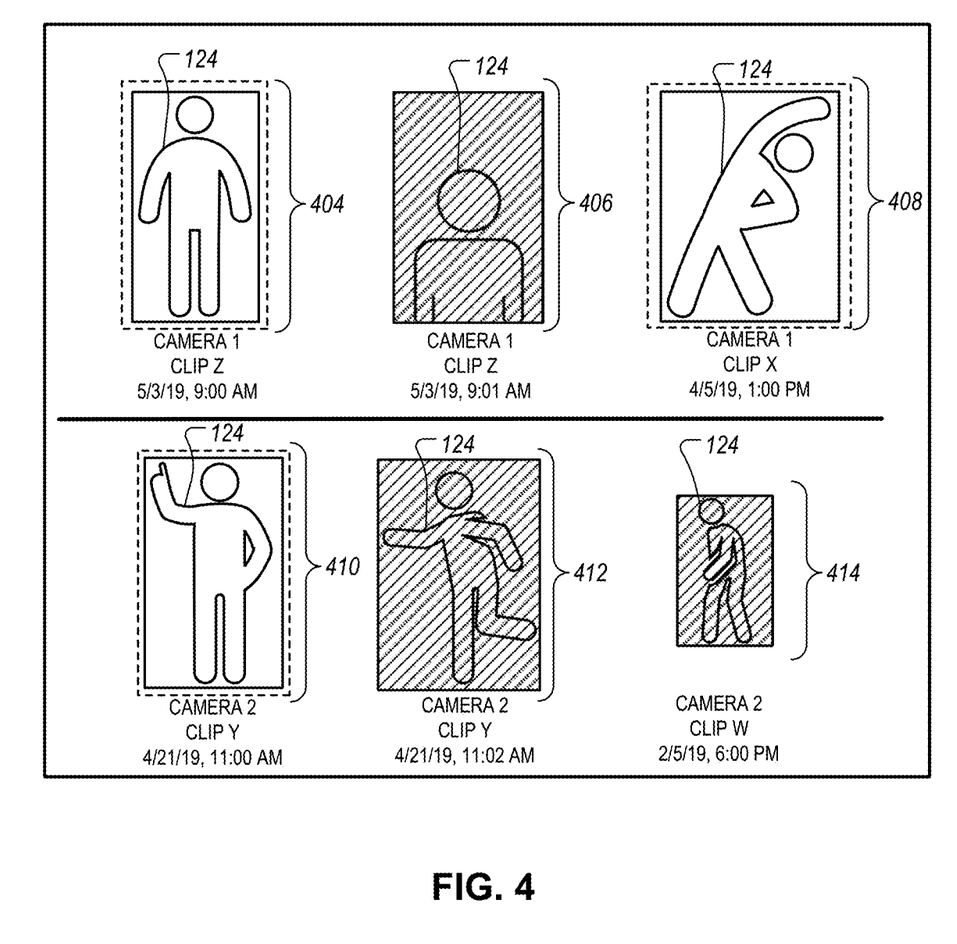
FIG. 4 is a diagram that illustrates a process for selecting thumbnails to display.

FIG. 4 is a diagram that illustrates a process used by the system 100 for selecting thumbnails for the known entity 124 to display. The process for selecting thumbnails may be completely automated by the system 100 (e.g., through the cross-clip engine 110 as shown in FIG. 1). The process for selecting thumbnails may be the same or similar for selecting thumbnails for an unassociated object (e.g., the unassociated object 116 as shown in FIGS. 1-2) and for selecting thumbnails for known entities. However, the criteria for selecting thumbnails for unassociated objects may be less stringent as there will generally be less thumbnails to choose from because all thumbnails for an unassociated object come from the single clip being analyzed while thumbnails for known entities can be taken from hundreds to thousands of clips. As an example, thumbnails of an unassociated object may need to meet criteria that are considered requirements to be viable for selection. However, in this example, thumbnails of an unassociated object need not meet criteria that are considered preferences to be viable for selection, e.g. due to the limited number of thumbnails available. As shown, the system 100 has six thumbnails for the known entity 124 to choose from.

The criteria that the system 100 uses for selecting one or more thumbnails includes include a particular size of the thumbnail or a particular size of a bounding box, whether the bounding box associated with the thumbnail includes face markup, the clip that the thumbnail is taken from, the camera that was used to take the clip that the thumbnail was taken from, whether the thumbnail was taken from the first frame in a clip, whether the thumbnail was taken from the last frame in a clip, whether an object within the thumbnail touches an edge of the thumbnail, whether the thumbnail touches an edge of the frame from which it was taken, a time and date of the frame from which the thumbnail was taken, or whether the bounding box associated with the thumbnail has been marked occluded. The system 100 may use one or more of the criteria when making a selecting.

For example, the system 100 may not consider any thumbnails where the object within the thumbnail touches an edge of the thumbnail because this indicates that the thumbnail contains only a partial image of the object. Similarly, for example, the system 100 may not consider any thumbnails where the thumbnails (or the bounding box from which it was generated) touched an edge of a frame of a clip. For example, the system 100 may not consider any thumbnails where the bounding box from which the thumbnail was generated was marked as occluded (e.g., during the generation of ground-truth data by the object identification system 104 shown in FIG. 1). For example, the system 100 may not consider any thumbnails that were taken from either the first frame or the last frame of a clip. For example, the system 100 may not consider any thumbnails that are below a threshold size. For example, the system 100 may not consider any thumbnails from a clip if a thumbnail from that same clip has already been selected for display. As another example, the system 100 may prefer to not consider any thumbnails from a clip if a thumbnail from that same clip has already been selected for display. However, in this example, if there are no other thumbnails from other clips or if there are only a limited number of thumbnails from other clips (e.g., only one other thumbnail, only two other thumbnails, etc.), then the system 100 may use other thumbnails from the same clip from which one thumbnail has already been selected. For example, the system 100 may prefer thumbnails that were taken from more recent clips. For example, the system 100 may prefer thumbnails that are from a camera that is different than the camera used to provide a thumbnail that has already been selected for display.

As another example, the system 100 may select thumbnails containing a higher quality image over thumbnails containing a lower quality image. The image quality of a thumbnail may be based on whether an object in the thumbnail is occluded such that the system 100 selects thumbnails containing unobstructed views of objects over thumbnails containing occluded views of objects. Similarly, the image quality of a thumbnail may be based on whether a thumbnail contains a face of an object such that the system 100 selects thumbnails containing the face of the object—e.g., for those objects that have faces, as determined by the system 100 based on the presence of face markup—over thumbnails which do not contain the face of the object. In these implementations, the system 100 may only select a thumbnail for display if the thumbnail contains an unobstructed view of the object and/or contains a face of the object. The image quality of a thumbnail may be based on past user behavior. For example, if a known entity A had previously been presented with thumbnails 1, 2 and 3, and the user had requested more thumbnails (e.g., thumbnails 4, 5, and 6)—the system 100 may then downgrade the quality score of thumbnails 1, 2 and 3. In this example, the next time the system 100 presents known entity A as an association option for a new unassociated object, the system 100 may present a set of thumbnails of known entity A other than thumbnails 1, 2, and 3, e.g. thumbnails 4, 5, and 6.

In some implementations, the system 100 may weigh certain criteria more heavily than others and/or may make certain criteria requirements while others are used for sorting. For example, the system 100 may make it a requirement that a thumbnail must be at least 200×200 pixels in size. In this example, the system 100 may sort the thumbnails that meet this size requirement by the time and date of the frames from which they were taken.

In some implementations, the system 100 may not require that all criteria be met if there are only a limited number of thumbnails for an unassociated object or a known entity to choose from. In these implementations, criteria that are considered requirements must still be met. However, some or all criteria that are considered preferences may not need to be met. For example, non-occluded bounding boxes, or bounding boxes being at least some minimum size are criteria that are considered requirements and must be met in order for a corresponding thumbnail to be considered viable for selection. As another example, face markup is a criteria that is considered a preference. Therefore, in this example, a bounding box need not have face markup in order for a corresponding thumbnail to be considered viable for selection.

As shown in FIG. 4, six thumbnails 404-414 are displayed for the known entity 124. Each of the thumbnails 404-414 is associated with a camera that took the clip from which the thumbnail was taken, the name of the clip from which the thumbnail was taken, and a time and date of the frame from which the thumbnail was taken.

As shown, the system 100 has chosen to display the thumbnail 404, the thumbnail 408, and the thumbnail 410. The system 100 has also rejected the thumbnail 406, the thumbnail 412, and the thumbnail 414. Here, the system 100 may have chosen to reject the thumbnail 406 because part of the known entity 124 is touching the edge of the thumbnail 406. The system 100 may choose to select the thumbnail 404 because it meets all of the criteria and is the most recent of the remaining thumbnails. The system 100 may choose to select the thumbnail 410 because it is meets all the criteria, including it being from a clip ("Clip Y") that is different than the clip associated with the thumbnail 404 ("Clip Z"), and is preferred because it is from a camera ("Camera 2") that is different than the camera associated with thumbnail 404 ("Camera 1") and is the next most recent thumbnail. The system 100 may choose to reject the thumbnail 412 because it is from the same clip ("Clip Y") as the thumbnail 410 which has already been selected. The system 100 may choose to select the thumbnail 408 because it meets all the criteria, including it being from a clip ("Clip X") that is different than the clip associated with the thumbnail 404 ("Clip Z") and the thumbnail 410 ("Clip Y"), and is preferred because it is the next most recent thumbnail. The system 100 may choose to reject thumbnail 414 for multiple reasons. First, the system 100 may determine that the thumbnail 414 is below a threshold size and reject it for that reason. Second, the system 100 may determine that it is to select only three thumbnails. Accordingly, because three sufficient thumbnails have already been selected, the system 100 may reject the thumbnail 414. Third, the system 100 may reject the thumbnail 414 due to having originated from a clip taken over a threshold time ago (e.g., over one month ago, over two months ago, over three months ago, etc.).

In some implementations, the system 100 may select more or less than three thumbnails for a particular entity. For example, the system 100 may select one, two, four, five, six, etc. thumbnails of the known entity 124 to present on an interface for associating an unassociated object of a device.

Figure 5:
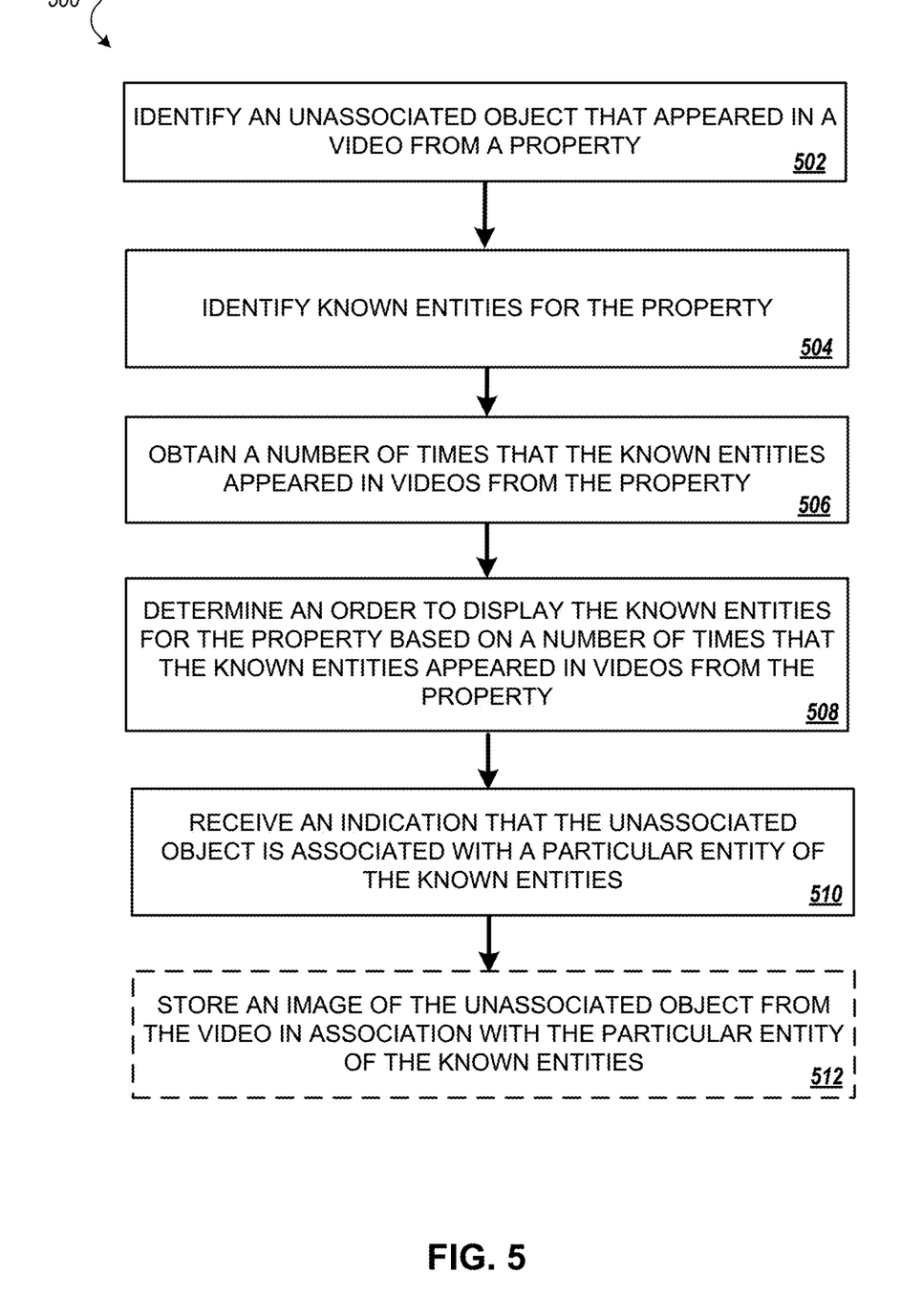
FIG. 5 is a flowchart of an example process for cross-video object tracking.

FIG. 5 is a flowchart of an example process 500 for cross-video object tracking. The process 500 can be performed, at least in part, using the system 100 described herein.

The process 500 includes identifying an unassociated object that appeared in a video from a property (502). An unassociated object may be, for example, a person, vehicle, animal such as a pet, or other animate object appearing in the video. An unassociated object may also include inanimate objects such as buildings, plants, or particular items. As an example, the cross-clip association engine 110 may identify the unassociated object 116 shown in FIGS. 1-2 appeared in a clip from the property 102. In another example, the cross-clip association engine 110 may receive a list of unassociated objects identified within a clip (e.g., the video) from property 102 by the object identification system 104 and identify the first unassociated object in the list as the unassociated object.

In some cases, identifying the unassociated object that appeared in the video includes obtaining one or more thumbnails from the video that each include a representation of an object that appeared in the video, analyzing the one or more thumbnails to obtain information that corresponds to the object, and determining, using the information, that the object is eligible for association with a known entity of the property. For example, the cross-clip association engine 110 may receive the thumbnails 118 from the object identification system 104 of the unassociated object 116. The thumbnails 118 may be generated from bounding boxes drawn in frames of the video. Each thumbnail of the thumbnails 118 may correspond to a particular frame of the video. The thumbnails 118 may indicate each appearance of the unassociated object 116 in the video, or each usable appearance of the unassociated object 116 in the video (e.g., each of the thumbnails 118 were marked as usable, are of sufficient size, do not border an edge of a frame of the video, include face markup if a the unassociated object 116 is classified as a person, etc.).

Analyzing the one or more thumbnails may include, for example, analyzing the one or more thumbnails to determine at least one of a size of at least one representation of the object in the video, an average size of multiple representations of the object in the video, that the one or more thumbnails have been marked as usable or unusable, an object classification associated with the one or more thumbnails, or a number of the one or more thumbnails. For example, the size of the representation of the unassociated object 116 may be the pixel size of a corresponding thumbnail that includes a representation of the unassociated object 116. The cross-clip association engine 110 may analyze the thumbnail to identify metadata associated with the thumbnail. This metadata may include an indication of the size of the thumbnail. Similarly, the cross-clip association engine 110 may determine an average size of multiple representations of the unassociated object 116 by averaging the determined pixel sizes of the thumbnails 118. As another example, the thumbnails 118 may include labels that indicate, for example, whether a particular thumbnail is usable or unusable, whether the thumbnail includes face markup, a classification for the object that is represented in the thumbnail (e.g., the unassociated object 116), etc.

Determining that the object is eligible for association with a known entity of the property may include, for example, determining at least one of that a size of at least one representation of the object meets a threshold size, that an average size of multiple representations of the object meets a threshold size, that at least one representation of the object has been marked as usable, that an object classification associated with the one or more thumbnails is a permitted classification, or that a number of the one or more thumbnails meets a threshold number. For example, the cross-clip association engine 110 may receive all thumbnails from the video that correspond to the unassociated object 116. The cross-clip association engine 110 may determine that the unassociated object 116 is eligible for association with a known entity after determining that the each of the thumbnails in the thumbnails 118 met a threshold pixel size and were not marked as unusable.

The process 500 includes identifying known entities for the property (504). A known entity may be, for example, a person, vehicle, animal such as a pet, or other animate object that has identified in one more previously identified videos. That is the known entity may have previously been associated with a previous unassociated object form a different video. A known entity may, in some cases, include inanimate objects such as buildings, plants, or particular items. As an example, the cross-clip association engine 110 may identify the known entities 120 and 124 shown in FIGS. 1-3. The known entities for a particular property may be identified based on the property. For example, the cross-clip association engine 110 may query the known entity database 112 for all known entities that were both previously seen in a clip from the property 102 and are people and, in response, receive information for just the known entities 120 and 124.

In some cases, identifying the known entities for the property includes receiving information corresponding to the known entities. For example, the cross-clip association engine 110 may receive an indication an object classification (e.g., type) that correspond to the known entities, a number of appearances for the known entities, and last recorded associations for the known entities. This information may be stored with a listing of known entities, such as part of a table that includes a list of known entities and/or known entities for the property 102. For example, the table 114 stored in the known entity database 112 includes a table 114 that provides a listing of known entities for the property 102 and corresponding information for those known entities.

In some cases, identifying the known entities for the property includes accessing a list of entities that have previously been identified from one or more previously analyzed videos. For example, the cross-clip association engine 110 may access the table 114 from the known entity database 112. In some cases, the table 114 includes information on known entities across properties in addition to the property 102.

In some cases, the process 500 includes selecting from the list of entities a subset of entities using eligibility criteria, wherein the known entities are those entities in the subset of entities. For example, the cross-clip association engine 110 may filter out known entities in the table 114 from consideration that do not meet certain criteria.

Selecting from the list of entities the subset of entities using eligibility criteria may include selecting from the list of entities only those entities that meet at least one of the following eligibility criteria: have previously been identified from one or more previously analyzed videos from the property, have appeared in a threshold number of videos, have appeared in a threshold number of videos from the property, have appeared in a threshold number of frames of videos, have appeared in a threshold number of frames of videos from the property, have appeared in a video that corresponds to a time that is less than a threshold amount of time from a current time, correspond to an object classification that is the same as an object classification corresponding to the unassociated object, have each been assigned a respective identification that is unique to the corresponding entity across multiple videos, or have not been associated with any previously unassociated objects that appeared in the video. For example, the cross-clip association engine 110 may filter out known entities in the table 114 that (i) have not been previously identified at the property 102, (ii) that have not been associated with a previously unassociated object in the past month (or that have not been identified in a video captured in the last month), (iii) that have greater than twenty total appearances, and (iv) have not already been associated with another unassociated object of the video. As a result of this filtering process, the cross-clip association engine may select a subset of known entities that only includes the known entity 120 and the known entity 124, e.g., thereby indicating that these are the only two known entities that meet the eligibility criteria.

As another example, if the cross-clip association engine 110 receive an indication that the unassociated object 116 is classified as a person, the cross-clip association engine 110 may filter out any known entities from the table 114 that are classified as an object other than a person.

The process 500 includes obtaining a number of times that the known entities appeared in videos from the property (506). For example, the cross-clip association engine 110 may receive or access the number of appearances shown in table 114 for each of the known entities shown in FIG. 1 from the known entity database 112.

The process 500 includes determining an order to display the known entities for the property based on a number of times that the known entities appeared in videos from the property (508). For example, the cross-clip association engine 110 determines that the known entity 120 should be displayed higher in the order than the known entity 124 due to the known entity 120 having appeared 50 times compared to the 20 times that the known entity 124 appeared shown in FIG. 1. With respect to FIG. 1, representations of the known entities may be displayed on the interface 130 of the user device 108 in the determined order. The known entity 120 may appear higher in the display order than the known entity 124 based on the known entity 120 having more appearances (fifty appearances) or significantly more appearances than the known entity 124 (twenty-one appearances).

In some cases, determining the order to display the known entities for the property based on the number of times that the known entities appeared in videos from the property includes determining the order to display the known entities for the property based on (i) a first factor that represents the number of times that the known entities appeared in videos from the property and (ii) a second factor that represents last association times that indicate when the known entities were most recently associated with a previously unassociated object. For example, the cross-clip association engine 110 may determine an order of the known entities using the corresponding number of appearances of the known entities (or frequency of appearances) as the first factor, the most recent associations of the known entities as the second factor.

The process 500 may optionally include applying a first weight to the first factor to generate a weighted first factor, and applying a second weight to the second factor to generate a weighted second factor. The second weight applied to the second factor may less than the first weight applied to the first factor. Determining the order to display the known entities for the property based on the first factor and the second factor may include determining the order to display the known entities for the property based on (i) the weighted first factor and (ii) the weighted second factor. For example, in determining an order of known entities, the cross-clip association engine 110 may normalize the number of appearances corresponding to the known entities and their most recent associations to obtain the first factor and the second factor respectively. The cross-clip association engine 110 may proceed to apply a weight of 0.8 to the first factor and a weight of 0.2 to the second factor, and use the weighted factors to determine the order of the known entities. For example, the cross-clip association engine 110 may use the weighted factors in an algorithm that it uses to generate scores for each of the known entities. The order of the known entities may be based on their corresponding score.

The process 500 includes receiving an indication that the unassociated object is associated with a particular entity of the known entities (510). For example, the cross-clip association engine 110 receives from the user device 108 an input of the selection of the known entity 124, indicating that the unassociated object 116 should be associated with the known entity 124 shown in FIGS. 1-2.

The process 500 optionally includes storing an image of the unassociated object from the video in association with the particular entity of the known entities (512). For example, the cross-clip association engine 110 may send one or more of the thumbnails within the series of thumbnails 118 of the previously unassociated object 116 as shown in FIGS. 1-2 to the known entity database 112 for storage. In this example, the known entity database 112 stores the received thumbnails and associates them with the known entity 124.

In some cases, the process 500 optionally includes, in response to receiving the indication that the unassociated object is associated with the particular entity, accessing an identification corresponding to the particular entity, and assigning the identification corresponding to the particular entity to the unassociated object. The identification may be unique to the particular entity across multiple videos. For example, the cross-clip association engine 110 may receive input from the user 106 through the user device 108 indicating that the unassociated object 116 should be associated with the known entity 124. In response to receiving this input, the cross-clip association engine 110 may access a cross-clip identification of the known entity 124, e.g., from the known entity database 112, and proceed to assign the cross-clip identification of the known entity 124 to the unassociated object 116. The cross-clip association engine 110 may proceed to update the known entity database 112 to, for example, update the information corresponding to the known entity 124 (e.g., upload one or more of the thumbnails 118, increase the number of appearances to twenty-one, update the last association date and time to May $7^{th}$ at 1:00 pm, etc.)

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
   identifying an unassociated object that appeared in a video from a property;
   identifying known entities for the property;
   obtaining a number of times that the known entities appeared in videos from the property;
   determining an order to display the known entities for the property based on a number of times that the known entities appeared in videos from the property; and
   receiving an indication that the unassociated object is associated with a particular entity of the known entities.

2. The method of claim 1, comprising storing an image of the unassociated object from the video in association with the particular entity of the known entities.

3. The method of claim 1, wherein identifying the unassociated object that appeared in the video comprises:
   obtaining one or more thumbnails from the video that each include a representation of an object that appeared in the video;
   analyzing the one or more thumbnails to obtain information that corresponds to the object; and
   determining, using the information, that the object is eligible for association with a known entity of the property.

4. The method of claim 3, wherein:
   analyzing the one or more thumbnails comprises analyzing the one or more thumbnails to determine at least one of:
     a size of at least one representation of the object in the video,
     an average size of multiple representations of the object in the video,
     that the one or more thumbnails have been marked as usable or unusable,
     an object classification associated with the one or more thumbnails, or
     a number of the one or more thumbnails; and
   determining that the object is eligible for association with a known entity of the property comprises determining at least one of:
     that a size of at least one representation of the object meets a threshold size,
     that an average size of multiple representations of the object meets a threshold size,
     that at least one representation of the object has been marked as usable,
     that an object classification associated with the one or more thumbnails is a permitted classification, or
     that a number of the one or more thumbnails meets a threshold number.

5. The method of claim 1, wherein identifying the known entities for the property comprises accessing a list of entities that have previously been identified from one or more previously analyzed videos.

6. The method of claim 5, comprising selecting from the list of entities a subset of entities using eligibility criteria, wherein the known entities are those entities in the subset of entities.

7. The method of claim 6, wherein selecting from the list of entities the subset of entities using eligibility criteria comprises selecting from the list of entities only those entities that meet at least one of the following eligibility criteria:
   have previously been identified from one or more previously analyzed videos from the property;
   have appeared in a threshold number of videos;

have appeared in a threshold number of videos from the property;
have appeared in a threshold number of frames of videos;
have appeared in a threshold number of frames of videos from the property;
have appeared in a video that corresponds to a time that is less than a threshold amount of time from a current time;
correspond to an object classification that is the same as an object classification corresponding to the unassociated object;
have each been assigned a respective identification that is unique to a corresponding entity across multiple videos; or
have not been associated with any previously unassociated objects that appeared in the video.

8. The method of claim 1, wherein determining the order to display the known entities for the property based on the number of times that the known entities appeared in videos from the property comprises determining the order to display the known entities for the property based on (i) a first factor that represents the number of times that the known entities appeared in videos from the property and (ii) a second factor that represents last association times that indicate when the known entities were most recently associated with a previously unassociated object.

9. The method of claim 8, comprising:
applying a first weight to the first factor to generate a weighted first factor; and
applying a second weight to the second factor to generate a weighted second factor, wherein the second weight is less than the first weight,
wherein determining the order to display the known entities for the property based on the first factor and the second factor comprises determining the order to display the known entities for the property based on (i) the weighted first factor and (ii) the weighted second factor.

10. The method of claim 1, comprising, in response to receiving the indication that the unassociated object is associated with the particular entity:
accessing an identification corresponding to the particular entity, wherein the identification is unique to the particular entity across multiple videos; and
assigning the identification corresponding to the particular entity to the unassociated object.

11. A system comprising:
one or more computers; and
one or more computer-readable media storing instructions that, when executed, cause the one or more computers to perform operations comprising:
identifying an unassociated object that appeared in a video from a property;
identifying known entities for the property;
obtaining a number of times that the known entities appeared in videos from the property;
determining an order to display the known entities for the property based on a number of times that the known entities appeared in videos from the property; and
receiving an indication that the unassociated object is associated with a particular entity of the known entities.

12. The system of claim 11, the operations comprising storing an image of the unassociated object from the video in association with the particular entity of the known entities.

13. The system of claim 11, wherein identifying the unassociated object that appeared in the video comprises:
obtaining one or more thumbnails from the video that each include a representation of an object that appeared in the video;
analyzing the one or more thumbnails to obtain information that corresponds to the object; and
determining, using the information, that the object is eligible for association with a known entity of the property.

14. The system of claim 13, wherein:
analyzing the one or more thumbnails comprises analyzing the one or more thumbnails to determine at least one of:
a size of at least one representation of the object in the video,
an average size of multiple representations of the object in the video,
that the one or more thumbnails have been marked as usable or unusable;
an object classification associated with the one or more thumbnails, or
a number of the one or more thumbnails; and
determining that the object is eligible for association with a known entity of the property comprises determining at least one of:
that a size of at least one representation of the object meets a threshold size,
that an average size of multiple representations of the object meets a threshold size,
that at least one representation of the object has been marked as usable;
that an object classification associated with the one or more thumbnails is a permitted classification, or
that a number of the one or more thumbnails meets a threshold number.

15. The system of claim 11, wherein identifying the known entities for the property comprises accessing a list of entities that have previously been identified from one or more previously analyzed videos.

16. The system of claim 15, the operations comprising selecting from the list of entities a subset of entities using eligibility criteria, wherein the known entities are those entities in the subset of entities.

17. The system of claim 16, wherein selecting from the list of entities the subset of entities using eligibility criteria comprises selecting from the list of entities only those entities that meet at least one of the following eligibility criteria:
have previously been identified from one or more previously analyzed videos from the property;
have appeared in a threshold number of videos;
have appeared in a threshold number of videos from the property;
have appeared in a threshold number of frames of videos;
have appeared in a threshold number of frames of videos from the property;
have appeared in a video that corresponds to a time that is less than a threshold amount of time from a current time;
correspond to an object classification that is the same as an object classification corresponding to the unassociated object;
have each been assigned a respective identification that is unique to a corresponding entity across multiple videos; or have not been associated with any previously unassociated objects that appeared in the video.

18. The system of claim 11, wherein determining the order to display the known entities for the property based on the number of times that the known entities appeared in videos from the property comprises determining the order to display the known entities for the property based on (i) a first factor that represents the number of times that the known entities appeared in videos from the property and (ii) a second factor that represents last association times that indicate when the known entities were most recently associated with a previously unassociated object.

19. The system of claim 18, comprising:
applying a first weight to the first factor to generate a weighted first factor; and
applying a second weight to the second factor to generate a weighted second factor, wherein the second weight is less than the first weight,
wherein determining the order to display the known entities for the property based on the first factor and the second factor comprises determining the order to display the known entities for the property based on (i) the weighted first factor and (ii) the weighted second factor.

20. One or more non-transitory computer-readable media storing instructions that when executed by one or more computers, cause the one or more computers to perform operations comprising:
identifying an unassociated object that appeared in a video from a property;
identifying known entities for the property;
obtaining a number of times that the known entities appeared in videos from the property;
determining an order to display the known entities for the property based on a number of times that the known entities appeared in videos from the property; and
receiving an indication that the unassociated object is associated with a particular entity of the known entities.

* * * * *